United States Patent [19]

Terada et al.

[11] Patent Number: 6,071,397
[45] Date of Patent: Jun. 6, 2000

[54] APPARATUS FOR PRODUCING DEIONIZED WATER

[75] Inventors: Ichiro Terada; Kazuo Umemura; Junjiro Iwamoto; Ken Komatsu, all of Yokohama, Japan; Mark Philip Huehnergard, Guelph, Canada

[73] Assignees: Asahi Glass Company Ltd., Tokyo, Japan; Glegg Water Conditioning, Incorporated, Guelph, Canada

[21] Appl. No.: 09/040,309

[22] Filed: Mar. 18, 1998

[30] Foreign Application Priority Data

Mar. 19, 1997 [JP] Japan ................................. 9-066762

[51] Int. Cl.[7] .................................................. B01D 61/48
[52] U.S. Cl. ............................................ 204/632; 204/634
[58] Field of Search .................................... 204/524, 533, 204/536, 632, 634

[56] References Cited

U.S. PATENT DOCUMENTS

| | | | |
|---|---|---|---|
| 5,154,809 | 10/1992 | Oren et al. | 204/524 |
| 5,759,373 | 6/1998 | Terada et al. | 204/524 |

FOREIGN PATENT DOCUMENTS

| | | |
|---|---|---|
| 0 422 453 | 4/1991 | European Pat. Off. . |
| 0 680 932 | 11/1995 | European Pat. Off. . |
| WO 96/22162 | 7/1996 | WIPO . |
| WO 97/34696 | 9/1997 | WIPO . |

OTHER PUBLICATIONS

Patent Abstracts of Japan, vol. 18, No. 61 (C–1160), Feb. 02, 1994, & Derwent Absracts, AN 93–373712, JP 5–277344, Oct. 26, 1993.

*Primary Examiner*—Arun S. Phasge
*Attorney, Agent, or Firm*—Oblon, Spivak, McClelland, Maier & Neustadt, P.C.

[57] ABSTRACT

An apparatus for producing deionized water comprising an electrodialyzer having cation exchange membranes and anion exchange membranes alternately arranged between a cathode and an anode to form demineralizing compartments and concentrating compartments, and ion exchange resin particles packed in the demineralizing compartments, wherein the ion exchange resin particles are a mixture of at least two groups of ion exchange resin particles having a particle size distribution such that particles having particle sizes of from 75 to 125% of the average particle size, are at least 85 wt % of the total amount, and the average particle size of a group of ion exchange resin particles having the maximum average particle size, is at least 1.5 times the average particle size of a group of ion exchange resin particles having the minimum average particle size.

13 Claims, No Drawings

APPARATUS FOR PRODUCING DEIONIZED WATER

BACKGROUND OF THE INVENTION

1. Field of the Invention

The present invention relates to an apparatus for producing deionized water.

2. Description of the Background

As a method for producing deionized water, it is common to employ a method of obtaining deionized water by passing water to be treated through a packed bed of ion exchange resins so that impurity ions are removed as adsorbed on the ion exchange resin. Here, it is common to employ a method of regenerating the ion exchange resin having its adsorbing ability lowered, by means of an acid or alkali. However, such a method has a problem that a waste liquid of the acid or alkali used for the regeneration, is discharged. Therefore, a method for producing deionized water which requires no such regeneration is desired. From such a viewpoint, an attention has been drawn in respect years to a self-regenerating type electrodialytic deionized water producing method wherein ion exchange resins are used in combination with ion exchange membranes. This method is a method wherein an ion exchanger is packed in demineralizing compartments of an electrodialyzer having anion exchange membranes and cation exchange membranes alternately arranged, and while supplying water to be treated to the demineralizing compartments, a voltage is applied to carry out electrodialysis to produce deionized water, while carrying out regeneration of the ion exchanger packed in the demineralizing compartments. With respect to this method, studies have been made on a method of limiting the width and the thickness of the demineralizing compartments (JP-A-61-107906), a method of passing water to be treated at least twice through a cell of an electrical deionizing apparatus (JP-A-1-307410) and a method of using an anion exchange resin as an ion exchange resin to be packed at a portion where water to be treated passes first (JP-A-4-71624). However, these methods have had a drawback that the electric resistance of the ion exchange resin is high, since the packing degree of the ion exchange resin packed in the demineralizing compartments, can not be controlled.

Under these circumstances, it is an object of the present invention to provide an apparatus for producing deionized water whereby deionized water of a high purity can be produced at a low electric resistance in a method for producing deionized water by a self-regenerating type electrodialytic method wherein ion exchangers and ion exchange membranes are used in combination.

The present invention provides an apparatus for producing deionized water comprising an electrodialyzer having cation exchange membranes and anion exchange membranes alternately arranged between a cathode and an anode to form demineralizing compartments and concentrating compartments, and ion exchange resin particles packed in the demineralizing compartments, wherein the ion exchange resin particles are a mixture of at least two groups of ion exchange resin particles having a particle size distribution such that particles having particle sizes of from 75 to 125% of the average particle size, are at least 85 wt % of the total amount, and the average particle size of a group of ion exchange resin particles having the maximum average particle size, is at least 1.5 times the average particle size of a group of ion exchange resin particles having the minimum average particle size.

Now, the present invention will be described in detail with reference to the preferred embodiments.

The present invention is characterized by using, as the ion exchange resin particles, a mixture of a plurality of groups of ion exchange resin particles having different average particle sizes. By such a method, it is possible to increase the packing degree of ion exchange resin particles packed in the demineralizing compartments and thereby to obtain deionized water at a low electric resistance.

In the present invention, each group of ion exchange resin particles has a particle size distribution such that at least 85 wt %, based on the total amount, of ion exchange resin particles are within a range of ±25% of the average particle size.

In the present invention, a mixture of groups of ion exchange resin particles having different average particle sizes, is used. It is particularly preferred to use a mixture of two or three groups of the above ion exchange resin particles.

In the present invention, a mixture of a plurality of groups of ion exchange resin particles having different average particle sizes, is used whereby the average particle size of the group of ion exchange resin particles having the maximum average particle size, is at least 1.5 times the average particle size of the group of ion exchange resin particles having the minimum average particle size. If it is less than 1.5 times, the effect for increasing the packing degree by the mixture of groups of ion exchange resin particles, tends to be small. It is more preferably from 2 to 5 times.

The average particle size of the group of ion exchange resin particles having the minimum average particle size is from 30 to 600 μm, more preferably from 150 to 400 μm. If the above average particle size is smaller than 30 μm, the porosity among the ion exchange resin particles tends to be low, and the flow resistance of water to be treated tends to be high, whereby the amount of water to be treated tends to decrease, or the pressure tends to be high, such being undesirable. further, if the average particle size exceeds 600 μm, the surface area per a unit apparent volume of the ion exchange resin particles tends to decrease, and the efficiency for adsorbing ion components tends to decrease, such being undesirable. The mixing ratio of the mixture of groups of ion exchange resin particles is preferably such that the number of particles in the group of ion exchange resin particles having the maximum average particle size is at most 50% of the number of particles in the total groups of ion exchange resin particles. If the number of such resin particles exceeds 50%, the effect for increasing the packing degree tends to be small, such being undesirable. It is particularly preferably from 3 to 35%, whereby the effect for increasing the packing degree will be large, and increase of the pressure loss will be small.

The groups of ion exchange resin particles in the present invention may be constituted by any one of a mixture of a plurality of cation exchange resin particles, a mixture of a plurality of anion exchange resin particles, or a mixture of cation exchange resin particles and anion exchange resin particles.

The ion exchange groups of the ion exchange resin particles are preferably a strongly acidic sulfonic acid type for cation exchange groups and a strongly basic quaternary ammonium salt type or pyridinium salt type for anion exchange groups from the viewpoint of the ion exchange performance and the chemical stability. The ion exchange capacity of the ion exchange resin particles is preferably from 0.5 to 7.0 meq/g dry resin. If the ion exchange capacity is lower than 0.5 meq/g dry resin, adsorption of ions or demineralization in the demineralizing compartments will not sufficiently be carried out, whereby the purity of treated water is likely to be low. On the other hand, if it exceeds 7.0 meq/g dry resin, the strength of the ion exchange resin tends to be remarkably low, such being undesirable. The ion exchange capacity is particularly preferably from 1.0 to 5.0 meq/g dry resin, whereby deionized water having a high purity can be obtained, and the stability in performance will be excellent.

Further, these ion exchange resin particles may be formed into a porous shaped product by means of a binder polymer. An ion exchanger formed into a sheet is a packing material suitable for use in the present invention, since it is easy to handle and can easily be packed, and the contact of ion exchange particles therein is excellent, whereby the electric resistance will be low. The water permeability of the porous ion exchanger is preferably at least 1 $kg \cdot cm^{-1} \cdot hr^{-1}$, more preferably from 20 to 200 $kg \cdot cm^{-1} \cdot hr^{-1}$ under a pressure of 0.35 $kg/cm^2$. If it is smaller than 1 $kg \cdot cm^{-1} \cdot hr^{-1}$, the amount of water to be treated tends to decrease, or a high pressure tends to be required for the operation, such being undesirable.

The above water permeability is determined in such a manner that a sample of a columnar shape (such as a prism or a cylinder) having mutually parallel end surfaces, is prepared, and water is introduced under a pressure of 0.35 $kg \cdot cm^2$ from one end surface while preventing water from leaking from the side surface, whereby the amount of water flowing out of the other end surface is measured to determine the water permeability. The water permeability is represented by $WL/A$ ($kg \cdot cm^{-1} \cdot hr^{-1}$), where A is the area ($cm^2$) of the end surface, L is the distance (cm) between the end surfaces i.e. the height of the columnar shape, and W is the water permeability per hour ($kg \cdot hr^{-1}$). A and L can be optionally set. However, it is preferred to carry out the measurement with A being at a level of from 1 to 1000 $cm^2$, and L being at a level of from 1 to 100 cm.

The porosity of the porous ion exchanger is preferably such that the continuous porosity governing passage of the liquid is at least 5 volume %. If the porosity is less than 5 volume %, the flow rate of the liquid decreases, and the pressure loss increases, such being undesirable. It is particularly preferred that the porosity is from 10 to 40 volume %, since the water permeation will be good, the demineralizing performance will be excellent, and treated water with a high purity can be obtained. This porosity is the value when the porous sheet is accommodated in a demineralizing compartment.

The porous ion exchanger can be formed from anion exchange resin particles alone, cation exchange resin particles alone or a mixture thereof. When a mixture of cation exchange resin particles and anion exchange particles is employed, they may not necessarily be uniformly mixed, and domains of cation exchange resin particles and domains of anion exchange resin particles may be present to form a phase-separated structure such as a sea-island structure or layer structure. However, the overall ratio of the cation exchange resin particles to the anion exchange resin particles is preferably such that the total ion exchange capacity ratio of the cation exchange resin particles/the anion exchange resin particles is within a range of from 30/70 to 80/20. If the total ion exchange capacity ratio is outside the above range, the purity of deionized water tends to be low, such being undesirable.

The weight ratio of the binder polymer used for the porous ion exchanger is preferably at most 20%, more preferably from 1 to 5%. If the weight ratio exceeds 20%, the binder polymer is likely to cover the surface of the ion exchange resin particles, whereby the adsorbing ability of the ion exchange resin particles tends to be low, and the porosity tends to be low, whereby the flow rate of the liquid to be treated tends to decrease, and the pressure loss tends to increase, such being undesirable. The binder polymer is preferably a thermoplastic polymer or a solvent-soluble polymer from the viewpoint of the method for producing the porous ion exchanger. More preferably, it is a polymer having ion exchange groups to prevent deterioration of the purity of deionized water.

Specifically, as the thermoplastic polymer, a low density polyethylene, a linear low density polyethylene, an ultrahigh molecular weight high density polyethylene, a polypropylene, a polyisobutylene, a polyvinyl acetate or an ethylene-vinyl acetate copolymer may, for example, be mentioned. As the solvent-soluble polymer, natural rubber, butyl rubber, polyisoprene, polychloroprene, a styrene-butadiene rubber, nitrile rubber or a vinyl chloride-fatty acid vinyl ester copolymer may, for example, be mentioned.

Further, as the polymer having ion exchange groups, a polymer containing a polystyrenesulfonic acid, a polyvinyl sulfonic acid, a poly(2-acrylamide-2-methylpropanesulfonic acid), a polyacrylic acid, a polymethacrylic acid or a perfluorosulfonic acid, or a polymer containing a salt thereof, may, for example, be mentioned. Further, a polymer containing a polyvinyl benzyl trimethylammonium chloride may be mentioned. Further, a polymer containing a poly(4-vinyl pyridine), a poly(2-vinyl pyridine), a poly (dimethylaminoethyl acrylate), a poly(1-vinyl imidazole), a poly(2-vinyl pyrazine), a poly(4-butenyl pyridine), a poly (N,N-dimethylacrylamide) or a poly(N,N-dimethylaminopropylacrylamide), or a polymer containing a quaternary ammonium compound thereof, may be mentioned. Further, a polymer containing a polyethylene imine may be mentioned. Among the above polymers, when a water-soluble polymer is to be employed, it is preferred to use it after carrying out crosslinking treatment by adding a crosslinking agent to the binder polymer solution.

The following method is preferred as a method for producing the porous ion exchanger of the present invention. Namely, preferred is a method wherein ion exchange resin particles and a binder polymer are heat-kneaded and then formed into a sheet by hot pressing such as flat plate pressing, a method wherein a binder polymer solution is coated on the surface of the ion exchange resin particles, and the solvent is evaporated for curing the binder polymer, a method wherein a binder polymer, a pore-forming material and ion exchange resin particles are heat-mixed and sheeted and then the pore-forming material is extracted, or a method wherein a binder polymer having a pore-forming material dispersed therein, is coated on the surface of ion exchange resin particles and cured, and then the pore-forming material is extracted.

The thickness of the porous sheet having the ion exchange resin particles bound by the binder polymer, is preferably from 1 to 300 mm, which corresponds to the distance between membranes of a demineralizing compartment. If the thickness is thinner than 1 mm, water in the demineralizing compartment tends to hardly flow, and the amount of treated water tends to be small, such being undesirable. If the thickness exceeds 300 mm, the electric resistance tends to be high, such being undesirable. The thickness of the molded product of the ion exchange resin particles is more preferably from 3 to 50 mm. This thickness is the value when the porous sheet is accommodated in a demineralizing compartment.

The apparatus for producing deionized water of the present invention is an apparatus for continuously producing deionized water by packing ion exchange resin particles in demineralizing compartments of an electrodialyzer wherein cation exchange membranes and anion exchange membranes are alternately arranged between a cathode and an anode.

Specifically, the following is preferred as a method for producing deionized water.

Namely, a plurality of cation exchange membranes and anion exchange membranes are alternately arranged between an anode compartment provided with an anode and a cathode compartment provided with a cathode, to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, alternately, in series in a total number of from 2 to 300 units, and ion exchange resin particles are packed in the demineralizing compartments. Demineralization is carried out by conducting an electric current while supplying water to be treated to the demineralizing compartments and supplying water to the concentrating compartments to discharge the concentrated salts, to produce deionized water while regenerating the ion exchange resin particles in the demineralizing compartments. It is preferred to apply a voltage of about 4 V to each unit cell so that dissociation of water takes place in the demineralizing compartments.

Now, the present invention will be described in further detail with reference to working Examples (Examples 1 and 2) and Comparative Example (Example 3). However, it should be understood that the present invention is by no means restricted to such specific Examples.

EXAMPLE 1

Sulfonic acid type cation exchange resin particles (Dow X Marathon C600, tradename, manufactured by Dow Chemical Company) having an average particle size of 630 $\mu$m (particle size distribution: 90 wt % within ±50 $\mu$m of the average particle size) and an ion exchange capacity of 4.3 meq/g dry resin, sulfonic acid type cation exchange resin particles (Diaion UBK550, tradename, manufactured by Mitsubishi Chemical Corporation) having an average particle size of 220 $\mu$m (particle size distribution: 85 wt % within ±50 $\mu$m of the average particle size) and an ion exchange capacity of 4.3 meq/g dry resin and quaternary ammonium salt type anion exchange resin particles (Dow X Marathon A, tradename, manufactured by Dow Chemical Company) having an average particle size of 575 $\mu$m (particle size distribution: 90 wt % within ±50 $\mu$m of the average particle size) and an ion exchange capacity of 3.9 meq/g dry resin, were dried and mixed in a ratio of 25/22.5/52.5 (weight ratio in dry state). Further, the ratio in the ion exchange capacity of the cation exchange resin particles and the anion exchange resin particles in the above mixture was 50/50, and the ratio in the number of the respective ion exchange resin particles was Dow X Marathon C600/Diaion UBK550/Dow X marathon A=4/83/13. The resistivity of this mixture in water with an electroconductivity of 10 $\mu$S/cm was measured by putting it in a cell and was found to be 440 $\Omega$·cm at a current density of 0.005 A/cm$^2$. At that time, the packing ratio of the ion exchange resin particles was 63 volume %.

Between an anode and a cathode, cation exchange membranes (Selemion CMT, tradename, manufactured by Asahi Glass Company Ltd.) and anion exchange membranes (Selemion AMP, tradename, manufactured by Asahi Glass Company Ltd.) were alternately arranged to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, alternately, in a total number of five units. The effective area of the above membranes was 500 cm$^2$. The above mixture of ion exchange resin particles was packed into the above demineralizing compartments having a width of 0.8 cm. Using water with an electroconductivity of 5 $\mu$S/cm as water to be treated, demineralization was carried out by applying a voltage of 4 V per unit cell, whereby deionized water having an electroconductivity of 0.07 $\mu$S/cm was obtained constantly.

EXAMPLE 2

To the same mixture of ion exchange resin particles as used in Example 1, a linear low density polyethylene (Affinity SM-1300, tradename, manufactured by Dow Chemical Company) was mixed in an amount of 3 wt % to the total weight of the polymer, followed by kneading at a temperature of from 120 to 130° C. The obtained kneaded product was hot-pressed at 130° C. by a flat plate press to obtain a porous sheet having a thickness of 6 mm. The water permeability of this porous sheet was 130 kg·cm$^{-1}$·hr$^{-1}$ under a pressure of 0.35 kg/cm$^2$, and the porosity of continuous pores was 20 volume %. Further, the resistivity in water with 10 $\mu$S/cm was measured by putting it in a cell and found to be 250 $\Omega$-cm at a current density of 0.005 A/cm$^2$. At that time, the packing ratio of the porous sheet ion exchanger was 73 volume %.

This porous sheet ion exchanger was set in each demineralizing compartment of the same electrodialyzer as used in Example 1, and a water treating test was carried out. Using water with an electroconductivity of 5 $\mu$S/cm as water to be treated, demineralization was carried out by applying a voltage of 4 V per unit cell, whereby deionized water with an electroconductivity of 0.07 $\mu$S/cm was obtained constantly.

EXAMPLE 3

Sulfonic acid type cation exchange resin particles (Diaion SK-1B, tradename, manufactured by Mitsubishi Chemical Corporation) having particle sizes of from 300 to 1180 $\mu$m and an ion exchange capacity of 4.5 meq/g dry resin, and quaternary ammonium salt type anion exchange resin particles (Diaion SA-10A, tradename, manufactured by Mitsubishi Chemical Corporation) having particle sizes of from 300 to 1180 $\mu$m and an ion exchange capacity of 3.5 meq/g dry resin, were dried and mixed in a ratio of cation exchange resin particles/anion exchange resin particles=44/56 (weight ratio in dry state) to obtain a mixture having an ion exchange capacity ratio of 50/50. The resistivity of the above mixture in water with 10 $\mu$S/cm was measured by putting it in a cell and found to have a high value at a level of 680 $\Omega$·cm at a current density of 0.005 A$^2$/cm. At that time, the packing ratio of the ion exchange resin particles was 58 volume %. This mixture of ion exchange resin particles was set in each demineralizing compartment of the same electrodialyzer as used in Example 1, and a water treating test was carried out. Using water with an electroconductivity of 5 $\mu$S/cm as water to be treated, demineralization was carried out by applying a voltage of 4 V per unit cell, whereby deionized water with an electroconductivity of 0.15 $\mu$S/cm was obtained.

By the apparatus for producing deionized water of the present invention, deionized water of a high purity can continuously be produced under a stabilized condition for a long period of time.

What is claimed is:

1. An apparatus for producing deionized water, comprising an electrodialyzer having cationic exchange membranes alternately arranged between a cathode and an anode to form demineralizing compartments and concentrating compartments, and wherein ion exchange resin particles are packed in the demineralizing compartments, wherein the ion exchange resin particles are a mixture of at least two groups of ion exchange resin particles with a first group having a particle size distribution of particles having particle sizes from 75 to 125% of the average particle size, and being at least 85 wt % of the total amount; and a second group having a maximum average particle size, which is at least 1.5 times the average particle size of the group of ion exchange resin particles having the minimum average particle size.

2. The apparatus of claim 1, wherein the group of maximum average particle size has an average particle size which is from about 2 to 5 times that of the group of minimum average particle size.

3. The apparatus of claim 1, wherein the number of particles in the group of ion exchange resin particles having the maximum average particle size is at most 50% of the total number of the ion exchange resin particles.

4. The apparatus of claim 3, wherein the number of particles in the group of ion exchange particles having the maximum average particle size is from 3 to 35% of the total number of the ion exchange resin particles.

5. The apparatus of claim 3, wherein the ion exchange resin particles have an ion exchange capacity of from 0.5 to 7.0 meq/g dry resin.

6. The apparatus of claim 1, wherein the average particle size of the group of ion exchange resin particles having the minimum average particle size is from about 30 to 600 $\mu$m.

7. The apparatus of claim 6, wherein the average particle size of the group of ion exchange resin particles having the minimum average particle size is from 150 to 400 $\mu$m.

8. The apparatus of claim 1, wherein the mixture of groups of ion exchange resin particles is a porous molded product bound by a binder polymer.

9. The apparatus of claim 8, wherein water permeability of the porous molded product is at least 1 kg·cm$^{-1}$·hr$^{-1}$ under a pressure of 0.35 kg/cm$^2$.

10. The apparatus of claim 8, wherein the porosity of the porous molded product is at least 5 vol. %.

11. The apparatus of claim 10, wherein the porosity of the porous molded product is from 10 to 40 mol. %.

12. The apparatus of claim 8, wherein the binder polymer for the porous molded product comprises at most 20 wt. % thereof.

13. The apparatus of claim 12, wherein the binder polymer comprises from about 1 to 5 wt. % thereof.

* * * * *